A. C. MORIN.
PROCESS OF MAKING METAL WHEELS.
APPLICATION FILED AUG. 2, 1918.
1,313,322.
Patented Aug. 19, 1919.
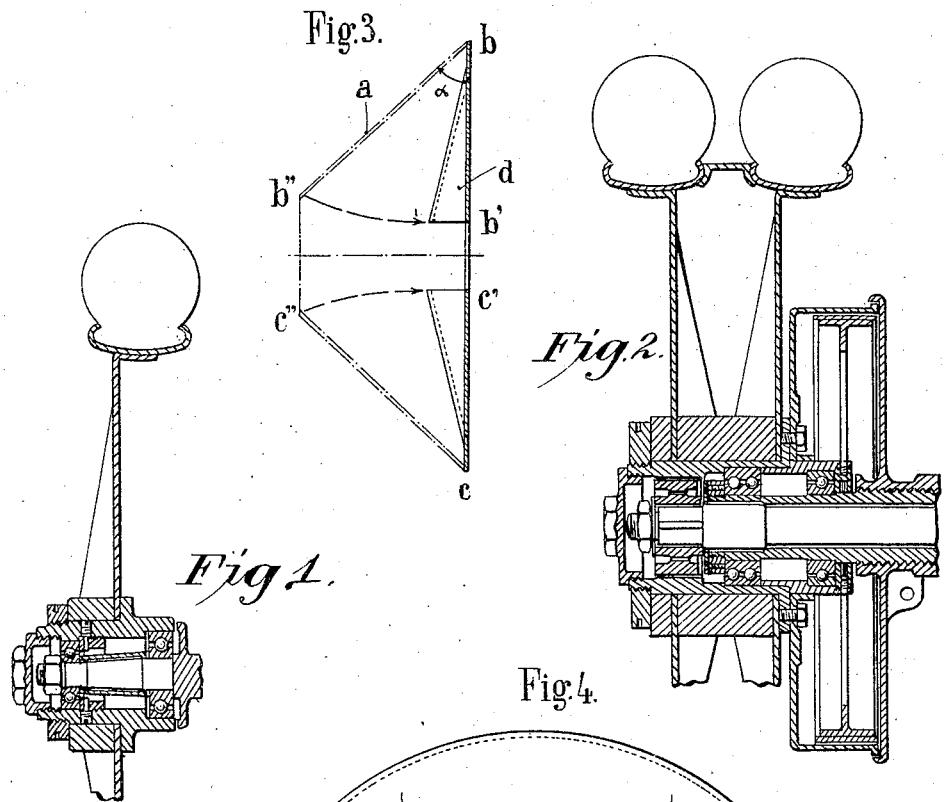
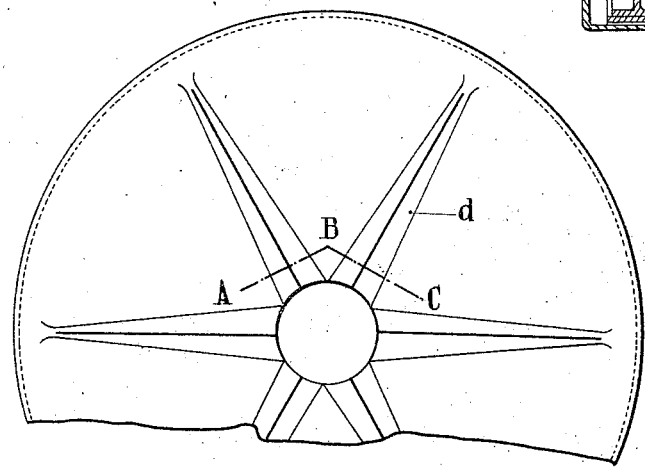
Fig. 5.  Fig. 6.  Fig. 7.
  
INVENTOR
Alfred Claude Morin
BY
ATTORNEY

UNITED STATES PATENT OFFICE.

ALFRED CLAUDE MORIN, OF PARIS, FRANCE.

PROCESS OF MAKING METAL WHEELS.

1,313,322.  Specification of Letters Patent.  Patented Aug. 19, 1919.

Application filed August 2, 1918. Serial No. 247,939.

*To all whom it may concern:*

Be it known that I, ALFRED CLAUDE MORIN, a citizen of the Republic of France, and resident of Paris, France, have invented a new and useful Process of Making Metal Wheels, which improvements are fully set forth in the following specification.

This invention relates to a process of making wheels of stamped out sheet metal. In order to make the following explanation as clear as possible, the accompanying drawing shows by way of example a stamped out wheel according to this invention.

Figure 1 is a half cross-section of the stamped out wheel made by the process according to the present invention, Fig. 2 is a half cross-section of a twin wheel, Fig. 3 is a diagrammatic view showing one of the means for obtaining the stamped out wheel shown on an enlarged scale in Fig. 4, and Figs. 5-7 are cross-sections, showing certain modifications from the point of view of corrugations of the wheel.

The wheel made by the process according to the present invention can be secured to a hub in a permanent or in a detachable manner, and is provided on its circumference with a fixed or detachable rim to suit the tire to be used. The body of the wheel is constituted as follows:

A sheet metal plate $a$ having the shape of a truncated cone such as shown in Fig. 3, is pressed between two suitable dies and the inclined surface of the cone is folded so as to bring it into the plane $b\ c$ which constitutes the plane of the wheel.

It will be understood that in this operation, as the diameter $b'\ c'$ of the final hole is smaller than the diameter $b''\ c''$ of the small base of the truncated cone, there will be necessarily produced in the folded or flattened plate radial ribs or corrugations $d$ which taper or decrease gradually from the center toward the peripheral edge of the plate, but which terminate short of said edge. (Fig. 4).

The ribs or corrugations will be produced during the stamping out operation by means of suitable dies, and it goes without saying that the developments of the said ribs $d$ must be calculated to suit the development of the surface angle $a$, etc.

The ribs $d$ can have any desired shape; by way of example, Figs. 5-7 respectively show V-shaped ribs, U-shaped ribs and ribs with faces flattened against each other.

The corrugations or ribs which form one of the characteristic features of the wheel, result in giving strength to the latter; they can be utilized to drive when the said wheel is a driving one and receives its movement through the hub as in the case of rear wheels of motor cars.

It goes without saying that the number and the projections of the corrugations can vary in an infinite manner.

As will be seen from Figs. 1 and 2, the wheel made by the process according to this invention can be used either alone or duplicated. It will be seen, on examining the figures in question, that one and the same hub can receive one wheel or two, according to the load on the vehicle, without any change in the fitting except the additional tightening of a nut, or the addition of a key in the form of a washer, of a thickness equal to that of the sheet metal used for the construction of the wheel.

It goes without saying that for the purpose of lightening the wheel, the sheet metal could be recessed or perforated between the radial ribs; these holes or recesses would moreover give access to the parts of the mechanisms behind the wheel.

Claim:

The process of making the web or center portion of a metal wheel, which consists in transforming a perforated disk of sheet metal into the shape of a truncated cone, and then flattening the cone in such manner as to form radial corrugations therein which corrugations extend from near the periphery of the blank to the perforation therein.

In testimony whereof I have signed this specification in the presence of two subscribing witnesses.

ALFRED CLAUDE MORIN.

Witnesses:
GEORGE LOISEL,
JOHN F. SIMONS.